C. H. GOODYEAR.
SYSTEM OF KEEPING NOTES.
APPLICATION FILED OCT. 29, 1917.
1,422,696.
Patented July 11, 1922.
2 SHEETS—SHEET 1.
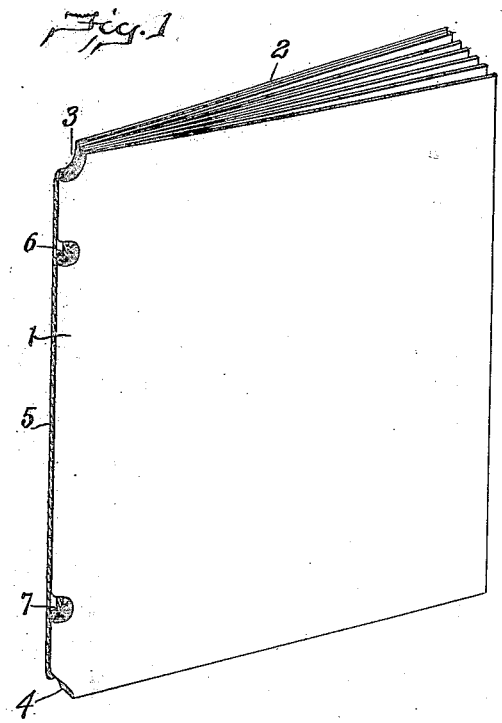
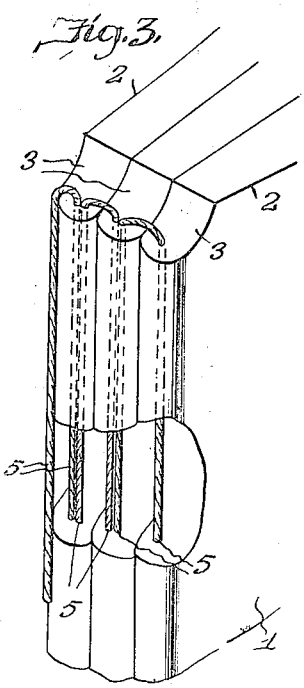
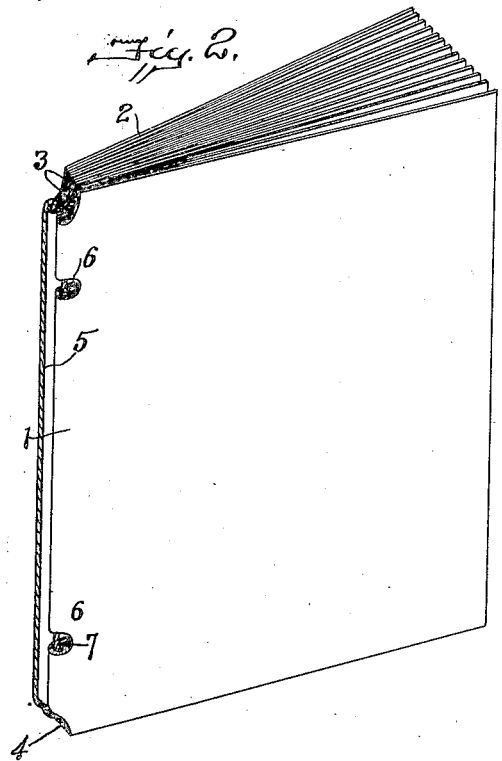
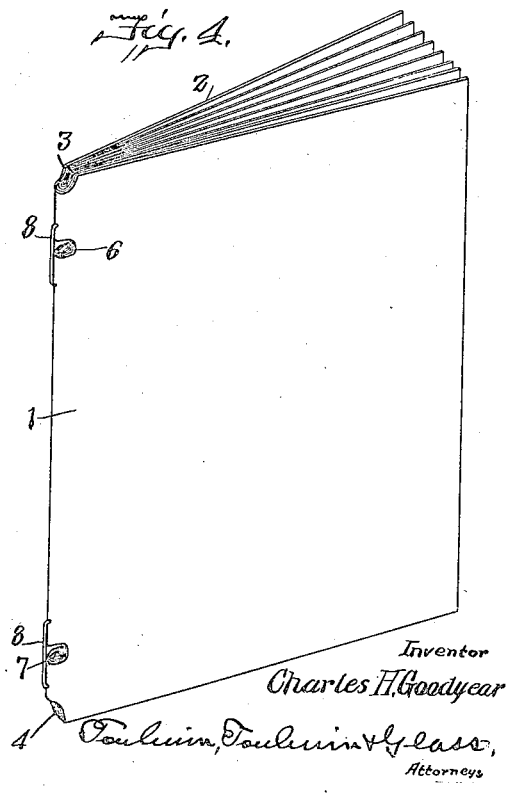
Inventor
Charles H. Goodyear
Toulmin, Toulmin & Glass,
Attorneys

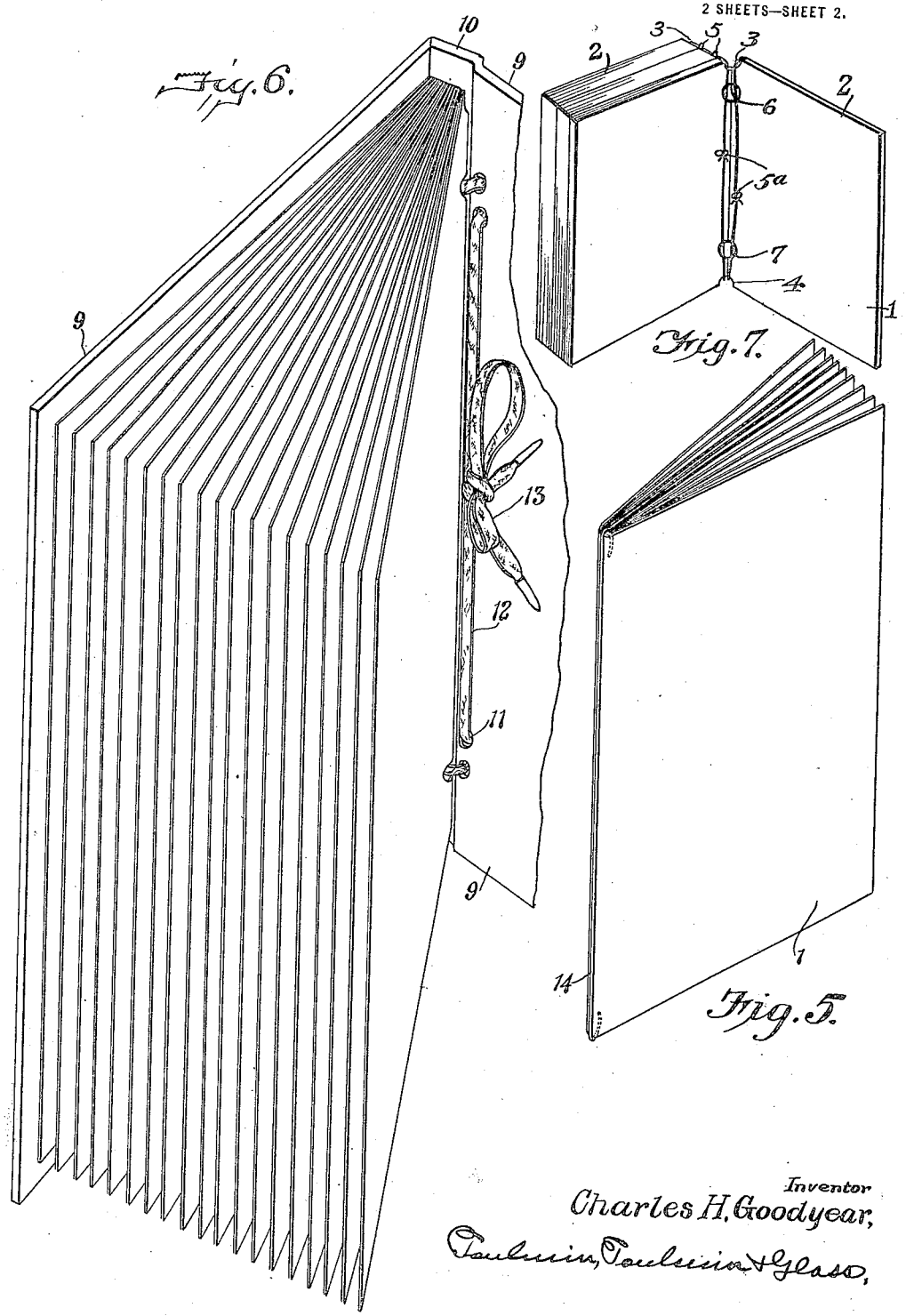

UNITED STATES PATENT OFFICE.

CHARLES H. GOODYEAR, OF CEDAR RAPIDS, IOWA, ASSIGNOR TO MISSOURI PAPER PRODUCTS COMPANY, OF ST. JOSEPH, MISSOURI, A CORPORATION OF MISSOURI.

SYSTEM OF KEEPING NOTES.

1,422,696. Specification of Letters Patent. Patented July 11, 1922.

Application filed October 29, 1917. Serial No. 198,949.

*To all whom it may concern:*

Be it known that I, CHARLES H. GOODYEAR, a citizen of the United States, residing at Cedar Rapids, in the county of Linn and State of Iowa, have invented certain new and useful Improvements in Systems of Keeping Notes, of which the following is a specification, reference being had therein to the accompanying drawing.

This invention relates to a system intended to aid in the keeping of notes in whatever relation may be desired. It provides a system of note books usable in sets or separately and constructed to prevent destruction of the elements of the system.

An object of the system is to aid in teaching the school students the principles of economy, neatness and efficiency. To this end the system provides sets of note units or signatures, sets being used separately when desired and the operation of the system being such, that all work done by the student may be submitted to the examiner. This aids in the results just referred to in a very marked degree.

An additional object is to provide a self binding system of the type described including a binder in which the separate units or sets of signatures may be permanently bound when desired.

A further object is to provide such a system comprised of units, comprised of sheets of paper detachably bound together, also "process tabs," composed merely of loose sheets of folded paper, arranged to be attached to above units, and a binder or portfolio in which the units may be permanently bound when desired.

The invention is an improvement on a prior application filed by the present inventor on October 16th, 1916, Serial No. 125,911, this application being a substitute for the abandoned application as to a part of matter therein shown.

In the accompanying drawings,

Fig. 1 shows a perspective view of a single unit;

Fig. 2 is a perspective view of a unit with "process tab" attached;

Fig. 3 is a perspective view showing the method of adding other units to the first;

Fig. 3ª is a like perspective view showing on a larger scale what is illustrated in Fig. 3;

Fig. 4 is a modification of the unit shown in Fig. 1, showing a different method of binding the sheets together;

Fig. 5 shows a further modification of Fig. 1;

Fig. 6 is a perspective view, showing a binder or portfolio, with a number of units permanently bound therein; and Fig. 7 is a perspective view of the same combination shown in Fig. 3, looking towards the front with one unit open showing particularly the knotted ends of two cords.

In general, the system includes a number of what are called "units," one being used for each study or subject required. Several sheets of a cheaper paper, folded, and the same size as the units may be attached thereto, thus offering a distinct section for process notes and all computations necessary in preparing the finished results. The "process tab" thus records the actual work of the student and from this, the finished work of the student is copied into the unit. Thus both the unit and the process tab may be compelled to be handed in to the teacher or examiner, and thereby the actual work of the student may be examined. By comparison of the work done with the time taken, the student can be corrected when a lack of efficiency is shown. Also, the knowledge that the student has, that all of his work must be submitted to the examiner, tends to produce neatness in the work and economy in the use of paper. In addition this use of the process tab, in particular, has one very decided advantage over the use of the ordinary paper tablet, in that the student may be compelled to use both sides of the sheets of paper. This is not true with the ordinary tablet for scratch work which the teacher or examiner never sees.

Referring first to Fig. 1, there is there shown a unit 1. It is composed of a plurality of sheets of paper 2 which are folded at their centers and shown as having notches 3 and 4, at the upper and lower central edges. Around these notches a cord 5 is looped, the ends of the cord being tied together, as shown in Fig. 3 of the drawings and additional notches 6 and 7 are provided adjacent the upper and lower corners through which the cord 5 passes. The part 5 is spoken of as a cord but it will be understood that any similar fastening device, such as a rubber band or wire may be employed if desired. Thus the sheets of paper 2 are held together by the cord 5 and prevented from detachment from each other, the ends of the cord being tied together or secured in any suitable manner.

Fig. 2 shows a unit and a process tab detachably bound together. On these two styles of tabs, the system is based—the unit for completed work and the process tab, (composed of a cheaper grade of paper) for experimental or process work. To connect these two tabs, the cord 5 of the unit is passed through the center of the folded edge of the process pamphlet; viz, the cord 5 of the unit in Fig. 2, that is the one nearest the reader, is inserted through the center of the lower or process tab.

In use it is intended that each style of pamphlet shown in Fig. 2 may be used in connection with some particular study. The actual work done by the student is put on the process tab and then the results in whatever form is desired are written in the unit. The two tabs are connected together by the cord 5 so as to be handled as one pamphlet and the student will have as many of these dual pamphlets as there are studies on which notes should be kept. This dual pamphlet, as a whole, is handed to the examiner or teacher for inspection whereupon the examiner may pass upon all the work actually done by the student. When the notes in the unit are completed, it may be detached from the process tab by opening the sheets of the process tab and slipping it from under the cord, which connects it to the unit and the unit may then be detachably bound to other units to await assortment later or permanently bound in a binder as later referred to.

Fig. 3 shows a plurality of such units or signatures as are shown in Fig. 1 detachably connected by similar cords 5. It will be seen that each adjacent pair of tabs has a common cord 5 running through the central edges of the sheets of paper composing the unit. The sheets of the last unit of the same kind may be inserted thereunder by opening the sheets of the unit and passing them under the cord. As many such units may be thus detachably connected together as are desired. It will be seen that by this style of binding, signatures of different subjects may be detachably connected in one volume, thus allowing the student to bind all of his finished notes in all his subjects in one volume for reference, any section or unit of which may be detached without detaching each unit composing the volume from every other unit by opening at the desired place and slipping the sheets from under the binding cord and handing in separately when desired, or at the end of the school year the work can be assorted in this manner and bound permanently in a binder hereinafter mentioned.

Fig. 4 shows a modified form of unit or signature to be used for tests or examinations, this view being similar to Fig. 1. In it there are sheets of paper and the same central notches 6 and 7, also the same corner notches 3 and 4. In place of the cord 5 there are provided staples 8, these being positioned to pass through the folding edges of the sheets 2 above and below the notches 6 and 7. The object of thus placing these staples will be clear when the binder is described. By the employment of these staples the sheets 2 of the paper are connected together in a manner preventing their detachment except by tearing them but there is no provision made for connecting two such units detachably together in the manner of Fig. 3, for example. The fact that the modified form in Fig. 4 is an exact counterpart of the regular units as shown in Figs. 1, 2 and 3 will allow for the handling of this modified unit perfectly in connection with the system as the modified unit may be slipped between other units or between any sheets of other units in such a way that the staple will be in position so that a shoestring may be passed back of the staple as well as back of the binding cords of the other units and thus afford a system whereby the corrected test or examination questions may be bound permanently together with the work on which the tests or examinations are based, although it is not bound to the other units by a binding cord.

The form of unit shown in Fig. 5 includes a plurality of sheets of paper, like Fig. 1, these being held together by a flexible wire 14 running along the back of the fold of the unit, around the corner notches at the top and bottom of the sheets, and being clamped into the paper on the inside of the fold and at a short distance from the top and bottom corners. The wire holds the sheets securely in place and offers a binding means whereby additional units of the same kind may be linked thereto by using the cords 5, as shown in Fig. 3.

Fig. 6 shows a binder into which the units may be placed. This binder has sides 9 and a back 10. The sides are provided with holes 11 near their upper and lower edges, these holes being positioned opposite the notches 6 and 7 of the units. Therefore the units may be placed in the binder and a cord 12 passes through the notches 6 and 7 inside the cords 5 or the staples 8 and the ends of the cord 12 be brought together in some type of knot or fastening 13.

The reason for placing the staples 8 opposite the notches 6 and 7 of the modified form of Fig. 4 will be apparent as this will permit the modified unit to be placed not only between any units bound together by the cord but also between any sheet of any unit and thus the notches of all units will coincide and will permit the binding cord 12 to pass therethrough. The regular units will thus be held from detachment by their binding cords 5 and the modified unit held from detachment by the staples 8. Thus in the forms of Figs. 1 and 4, the cord 12 is passed through the notches 6 and 7 inside the cord 5 or the staples 8 and the same result of binding the units in the portfolio is thereby obtained.

In some of the claims the units of Figs. 1 and 3 are referred to as being detachably connected together, while the units shown in Fig. 6 are spoken of as being permanently bound in the binder. These terms "detachably" and "permanently" are used in a somewhat relative sense, the idea being to distinguish between the type of connection in Fig. 3, in which the units are intended to be sooner or later detached from each other and the type of fastening in Fig. 6 where the idea is that the units shall not be detached from the binder holding them.

In Fig. 7 I have shown the cords 5 connected at their ends, say, by being tied, as indicated at 5ª, but they may be otherwise united at their ends.

It will be seen that the system described is well adapted to carry out the objects first stated. It provides a check by which all work done is submitted to the examiner, whereby the improper methods of the student are or may be corrected. The unit and the scratch tab are being temporarily or detachably bound together and submitted together. They are then separated and the unit of finished work filed in the binder or portfolio. The portfolio, of course, is merely optional, it being unnecessary to the fundamental idea of the system which comprises means for aiding in the production of economy and efficiency in the student by compelling the submission of all work.

Having thus fully described my invention, what I claim as new and desire to secure by Letters Patent, is:—

1. In a device of the class described, the combination, of two sections of paper, each of which is formed of a plurality of sheets of paper folded across the center thereof, a cord extended along the inner surface of the fold of each section and across the edges of both sections at the top and bottom thereof, the ends of said cord being tied together.

2. In a device of the class described, the combination, of two sections of paper, each of which is formed of a plurality of sheets of paper folded across the center thereof and having corner notches in each section at each end of the fold, a cord extended along the inner surface of the fold of each section and passing through said corner notches and across the edges of both sections at the top and bottom thereof, the ends of said cord being tightly secured together.

3. In a device of the class described, the combination, of a plurality of sections of paper, each formed of a plurality of sheets of paper folded across the center thereof, a cord extended along the inner surfaces of the folds of the first and second sections, and across the edges of both sections, at the top and bottom thereof, a cord similarly placed with respect to the second and third sections, and so on through the other sections, and a cord having its outer portion passed along the outer surface of the fold of the last section and extended across the edges of said section and along the inner surface of the fold thereof.

4. The combination of a plurality of sections of paper, each section of which is formed of a plurality of sheets of paper folded across the center thereof; holding means for each section, said holding means having its outer portion passed along the outer surface of said fold and extended around the edges of said section and extended therefrom along the inner surface of said fold; the ends of said holding means being tightly secured together for holding said sheets together in bound form; the other portion of said holding means having the center of another and similarly formed section placed thereunder for detachably securing said section to said other section, and so on throughout said plurality of sections.

5. A plurality of sheets of paper folded together across the center of said plurality of sheets forming a section, said section having corner notches formed therein at the ends of said fold; a cord passed along the outer surface of said fold and extended around the edges of said section through said corner notches, said cord being extended therefrom along the inner surface of said fold; the ends of said cord being tightly secured together; another similarly formed section having the outer portion of said cord placed in the center thereof in its fold for holding said sections together; a third section similarly formed and secured on said other section by the outer portion of the cord of said other section; and a cover for said sections, said cover having corner notches for the reception in similar manner of the outer portion of the cord of said third section.

6. A plurality of sheets of paper folded together across the center thereof, forming a section, said section having intermediate notches formed therein through its folded edge; a cord passed along the outer surface of said fold and extended around the edges of said section, said cord being extended therefrom along the inner surface of said fold; the ends of said cord being tightly secured together; another similarly formed section having the outer portion of said cord placed in the center thereof in said fold, for holding said sections together; a third section similarly formed and secured on said other section by the outer portion of the cord of said other section; a cover for said sections, said cover having apertures formed through the edges thereof in register with said intermediate notches; a tie string passed through said apertures and through said notches between said sections and certain portions of their respective cords; the ends of said tie string being tightly secured together for securely holding said sections of sheets of paper and cover together in bound form.

7. In a device of the class described, the combination, with a plurality of units and a plurality of process tabs, each of said units and tabs being composed of a plurality of sheets bound together, and each process tab being associated with a corresponding unit, of a binder in which the units may be permanently bound after they have been detached from their corresponding process tabs, and means for fastening said units in said binder.

In testimony whereof, I affix my signature

CHARLES H. GOODYEAR.